United States Patent

[11] 3,610,611

[72] Inventors James O. Elliott
 Xenia;
 George W. Jackson, Dayton, both of Ohio
[21] Appl. No. 19,159
[22] Filed Mar. 13, 1970
[45] Patented Oct. 5, 1971
[73] Assignee General Motors Corporation
 Detroit, Mich.

[54] AUTOMATIC VEHICLE LEVELING SYSTEM WITH ELECTRONIC TIME DELAY
 5 Claims, 7 Drawing Figs.
[52] U.S. Cl. .................................................. 267/65 D,
  280/124 F, 280/6 R
[51] Int. Cl. ..................................................... B60g 11/26
[50] Field of Search .......................................... 267/65 D;
  280/124 F, 124 R, 6, 6 H, 6.1

[56] References Cited
UNITED STATES PATENTS
2,828,139 3/1958 Lantzenhiser ............... 267/65 D Primary Examiner—Philip Goodman
Attorneys—W. S. Pettigrew and J. C. Evans ABSTRACT: In preferred form, a fully automatic electrically operated leveling system for a vehicle having an undamped height sensing electric switch on one of a pair of air springs that operates to indicate vehicle height. An electric motor driven air compressor and electronic control circuit are mounted as a unit in a sealed storage tank along with a solenoid operated valve. The air compressor exhausts air from the springs into the tank to lower the vehicle chassis when it is unloaded. The solenoid operated valve directs air from the tank to the springs to raise the vehicle chassis when it is loaded. The electronic control circuit includes time delay means to prevent energization of the motor or solenoid in response to normal road movements of the vehicle.

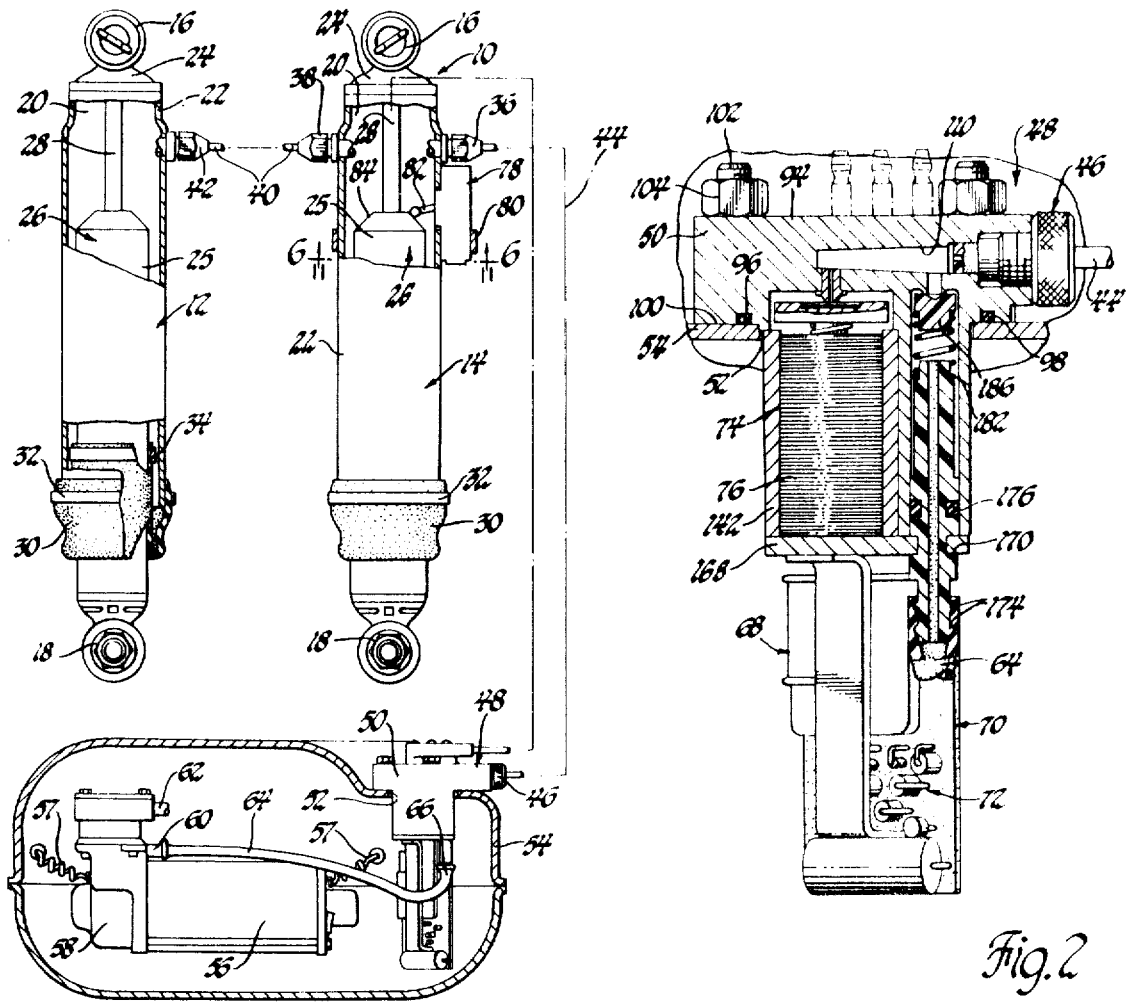
Fig.1
Fig.2
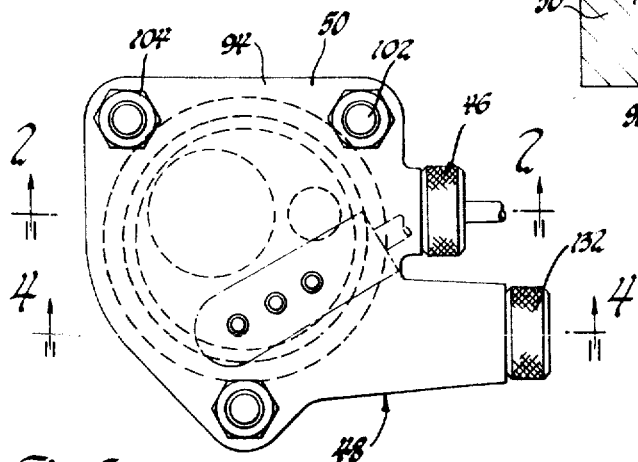
Fig.3
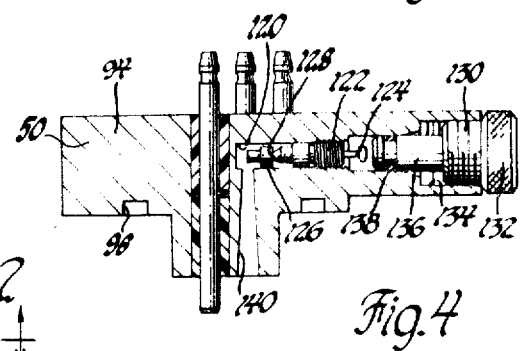
Fig.4
INVENTORS
James O. Elliott, &
George W. Jackson
BY J.C. Evans
ATTORNEY INVENTORS
James O. Elliott, &
George W. Jackson BY J.C. Evans
ATTORNEY

AUTOMATIC VEHICLE LEVELING SYSTEM WITH ELECTRONIC TIME DELAY

This invention relates to fully automatic electrically operated, leveling systems for a vehicle and more particularly to a system of this type having first and second electrically energizable components for controlling exhaust and inflation of a fluid spring in the system.

In automatic level controls for vehicles it is desirable to have an all electric powered, automatic leveling system which will maintain the rear axle to chassis separation of the vehicle within a set range as weight is added or removed from the passenger compartment or trunk of the vehicle.

In such systems the axle to chassis separation varies directly with applied load which causes the length of the primary load supporting spring of the suspension to be reduced. Height correction of changes in the axle to chassis separation may be produced by means that will introduce or exhaust a predetermined amount of pressurized fluid into or from rear located auxiliary load supporting fluid springs to raise or lower the rear of the vehicle chassis as required.

The electrical controller of such leveling systems desirably should operate independently of changes in riding height that occur during normal vehicular maneuver such as stopping, accelerating, climbing grades, or traveling curves, corners or uneven roads. These maneuvers henceforth being characterized as normal road movements.

Furthermore, the electrical controller should be one that is able to accurately maintain a predetermined height relationship between the sprung mass of the vehicle, represented by the vehicle chassis, and its unsprung mass, represented by the rear axle assembly when connected to a variable power source from 10 to 15 volts such as is produced by a 12 volt direct current battery of a vehicle. The controller should be one that is able to handle as high as 28 amperes of compressor motor current during startup.

Furthermore, it is desirable to include a low cost double pole double throw undamped switch for sensing the height of the vehicle and to provide an equally low cost electronic circuit in association therewith for providing a predetermined time period delay before any of the electrical control components of the leveling system are operated thereby to isolate the system from ordinary road movements of the type set forth above.

Moreover, in such systems it is desirable to arrange the electric motor driven compressor and solenoid operated valve in a compact unitary prechargeable package that is easily located in a limited amount of space within the engine compartment at a point accessible from under the hood.

An object of the present invention is to improve vehicle leveling systems by the provision therein of an electric motor controller including a relay operated switch having an energizable coil, an undampened height sensing switch for electrically connecting the coil to a power source and a static amplifier connected to the coil and controlled by timer means to be conductive following a predetermined road movement dampening time period to complete a current path through the coil for energizing the motor only in response to sustained vehicle load changes.

Still another object of the present invention is to provide an improved vehicle leveling system having an electronic module which includes delay means for association with first and second height controlling electrical components of the system to delay operation of the components for a predetermined time period when an undamped electrical switch detects vehicle body moves above and below a predetermined height in response to normal road movements.

Another object of the present invention is to provide an improved automatically controlled, electrically powered leveling system for changing the pressure within an auxiliary load supporting fluid spring wherein the system includes a pressurized tank enclosing an electric motor driven compressor for pumping down the fluid springs to reduce the load bearing capacity thereof and wherein a compact combination electric control circuit and solenoid operated valve assembly is supported within the tank and operative to direct high-pressure fluid from the tank to the fluid springs to increase the load carrying capacity thereof; an undamped height sensor switch detects whether the vehicle body is above or below a predetermined control height and conditions the control circuit for selectively operating the electrical components to maintain the control height.

Still another object of the present invention is to provide an improved all electric automatically controlled vehicle leveling system of the type including auxiliary load carrying fluid springs having the pressure level therein controlled by flow of pressurized fluid through a common exhaust and supply conduit connected to the fluid springs by the provision of combination valve control unit fit within a sealed storage tank having an electrically motor driven compressor therein discharging directly into the tank for pressurizing it and wherein the compressor has its inlet in communication with the conduit through a one way check valve for pumping down the fluid springs and wherein the valve control unit includes a solenoid operated valve selectively energized when the vehicle body is below a predetermined height to communicate the interior of the tank with the fluid springs for increasing the load carrying capacity thereof.

Still another object of the present invention is to provide an improved all electrically automatically controlled leveling system that has an electrically motor driven compressor within a pressurized tank and an electric solenoid operated valve and an electronic control circuit that are in a package sealed within the tank for regulating flow through a first passageway into a common conduit from the valve assembly to the fluid spring means and wherein the package includes a second passageway to the common conduit that is controlled by a one way check valve that prevents backflow of fluid from the pressurized tank through the compressor to the common conduit and serves as a path for flow of fluid to the compressor during a pumpdown phase of operation.

These and other objects are attained in one working embodiment of the invention in a system that includes two spaced apart auxiliary load supporting combination shock absorber and air spring units each having their top and bottom mounts adapted to be connected respectively between the lower frame of the vehicle body and the rear axle housing of the rear suspension of the vehicle. The system includes a double pole, double throw switch that is strapped on one side of one of the units to sense the height relationship between the top of the shock absorber and a surrounding dust shield portion of the shock absorber which in turn represents the height relationship between the vehicle body and the axle housing.

When the vehicle body is above a desired height relationship the switch is in a first position wherein an electric motor is energized to pump down both of the auxiliary load carrying air springs on the combination unit and to increase the pressure within a storage tank. When the vehicle body is below the desired height relationship the switch is positioned to energize a solenoid valve for connecting the pressurized tank with the air spring means to increase the pressure level therein; to raise its load supporting capacity; to return the vehicle body to a desired height relationship with the axle housing.

The switch is an undamped mechanism that electrically connects first and second electrical components in the system to the positive terminal of the vehicle battery. An electronic control module receives a signal from the switch each time it connects one or the other of the components to the battery to charge a timing circuit that delays energization of a static amplifier that powers the electrical components in the system.

The time delay is selected to prevent operation of the electrical components in response to ordinary vehicle road movements.

A switching transistor is turned on each time one of the components is connected to the power supply to complete the timing circuit. When the undampened switch on the air spring is turned off the switching transistor is turned off and the timing circuit is reset. Thus, only a sustained load change that maintains the undamped height sensor switch continuously closed will cause the timing circuit to condition the static amplifier conductive thereby to energize one of the other of the components to produce a change in the pressure level of the air springs for leveling.

Further objects and advantages of the present invention will be apparent from the following description, reference being had to the accompanying drawings wherein a preferred embodiment of the present invention is clearly shown.

FIG. 1 is a diagrammatic view of a leveling system including the present invention;

FIG. 2 is an enlarged view in vertical section taken along the line 2—2 of FIG. 3 looking in the direction of the arrows;

FIG. 3 is a view in top elevation of a valve and electronic controller assembly in the present invention;

FIG. 4 is a vertical sectional view taken along the line 4—4 of FIG. 3 looking in the direction of the arrows;

Figure 5:
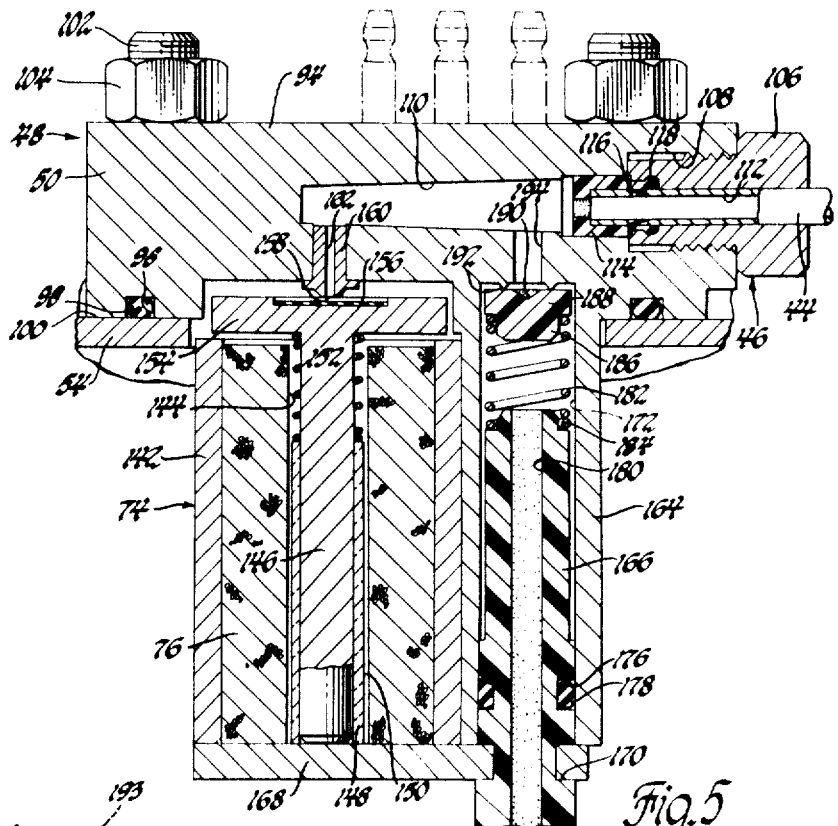
FIG. 5 is an enlarged vertical sectional view of the valving components of the assembly in FIG. 2.

Referring now to the drawings, in FIG. 1 a fully automatic electric closed loop vehicle leveling system 10 is illustrated. It includes a pair of combination shock absorber and air spring units 12, 14 each of which includes a top end mount assembly 16 and a bottom end mount assembly 18. The top end mount assembly 16 is adapted to be connected to the bottom frame of a vehicle body which represents a sprung mass. The bottom end mount 18 is adapted to be connected to a portion of the rear suspension assembly, for example, the rear axle housing which represents an unsprung mass in the system.

Both of the units 12, 14 represent an auxiliary load supporting device that is associated with a primary load supporting spring that maintains a predetermined curb height between the vehicle body and the axle housing when the vehicle is unloaded.

In order to maintain this predetermined curb height or any other predetermined height relationship, the vehicle leveling system 10 is operated to vary the pressure in a variable volume pressurizable fluid chamber 20 of each unit 12, 14 formed between a dust tube 22 closed at its upper end by a cap 24 and an outer cylinder 25 of a shock absorber 26.

In the illustrated arrangement the shock absorber 26 also includes a piston rod 28 that moves exteriorly of the cylinder 25.

The chamber 20 is closed by a flexible sleeve 30 that has one end thereof fastened to the open lower end of the dust tube 22 by a clamp ring 32 and the opposite end thereof secured to the outer periphery of the cylinder 25 by a clamp ring 34.

The chamber 20 of the unit 14 has an inlet fitting 36 thereon and an outlet fitting 38 that is joined by a crossover tube 40 to an inlet fitting 42 to the chamber 20 of the unit 12. A common exhaust and supply conduit 44 has one end thereof connected to the inlet fitting 36 and the opposite end thereof connected to a fitting 46 on a combination valve and fluid supply assembly 48.

In the illustrated arrangement the assembly 48 includes a housing 50 that is supported in an opening 52 of a pressurized storage tank 54.

An electric compressor drive motor 56 is supported within the tank 54 by springs 57. It drives an air compressor 58 having an inlet 60 and an outlet 62.

The outlet 62, more particularly, is in direct communication with the interior of tank 54 and the inlet 60 is connected to one end of a spring reinforced suction tube 64 that has the opposite end thereof connected to a tube member 66 depending from the housing 50.

In the illustrated arrangement the electrical drive motor 56 is controlled by a relay operated switch 68 that is supported on one side of a circuit board 70 along with an electronic control module 72 to be described.

The relay 68 constitutes a first electrically energizable component for controlling the operation of the leveling system 10.

Additionally, the system includes a solenoid operated valve 74 which communicates the tank 54 with the conduit 44 when a coil 76 thereof is energized.

The coil 76 constitutes a second electrically energizable component for regulating the operation of the leveling system 10.

The system 10 further includes a height sensor switch 78 that is held on one side of the unit 14 by a strap 80 to locate a cam operator 82 in spring biased relationship with the top closure 84 of the shock absorber cylinder 25 of unit 14 to position a contact carrying movable spring arm 86 with respect to a first pair of motor contacts 88 and a second pair of solenoid contacts 90 both of which are maintained normally open and are bridged when the movable spring arm 86 has spaced apart contacts 92, 93 thereon in engagement with one or the other of said motor or solenoid contacts 88, 90.

The height sensor switch 78 is a low cost nondamped unit that senses each relative movement of the dust tube 22 with respect to the shock absorber cylinder 26 which reflects normal road movements between the sprung and unsprung mass of the vehicle.

Referring now more particularly to the combination valve and fluid supply assembly 48, as seen in FIG. 2, the housing 50 thereof includes a head portion 94 located exteriorly of the tank 54. It includes an annular groove 96 having an O-ring seal 98 thereon that is held in sealing engagement with a flat outer surface portion of the tank 100 around the opening 52 therein.

More particularly, the unit includes a plurality of weld bolts 102 on the tank 100 that extend through the head portion 94 at the corners thereof and threadably receive nuts 104 on the threaded ends thereof to sealingly press the O-ring 98 against the surface 100 to prevent leakage between the housing 50 and the tank 54 around the opening 50 therein.

The fitting 46 more particularly shown in FIG. 5, includes a nut 106 which is threaded into a tapped opening 108 in communication with a crossover passageway 110.

The common exhaust and supply conduit 44 has one end 112 therein directed through the nut 106 and into a tubular resilient sealing element 114 which is held in sealing engagement with the outer periphery of the tube 112 by a deformed metal ferrule 116 that has the nose portion 118 thereof deformed radially inwardly of the outer surface of the tube 112 for holding it in place within the fitting 46.

In order to precharge the tank 54 the housing portion 94 further includes an inlet passageway 120 that is located in spaced parallelism with the crossover passage 110 as is shown in FIG. 4. The passageway 120 has a valve 122 threadably supported therein which includes a movable stem 124 biased by spring means (not shown) in a direction to move a valving element 126 into sealed engagement with a seat 128.

A threaded plug 130 with a knurled head 132 is threadably received in a tapped opening 134 when the tank has been precharged. It includes a stem 136 with an annular O-ring 138 supported in a groove therein to seal the inlet passageway 120 and to prevent inadvertent operation of the charging valve 122.

When the plug 130 is removed a charge fitting can be inserted into the tapped opening 134 to cause the stem 124 to be depressed thereby to allow flow of pressurized fluid through the inlet opening 120 which has a 90° offset extension 140 therein which communicates with the tank interior through the base of the housing 50.

Referring now more particularly to FIG. 5 the solenoid operated valve 74 is illustrated as including an outer housing 142 which protects the coil 76. The coil has a central opening 144 therethrough in which is centered an elongated armature stem 146 that is supportingly received within a sleeve bearing 148 located in spaced relationship to the inner periphery of the coil 76 to define an annular flow passageway 150 therebetween.

On the upper end of the sleeve 148 is supported one end of a coil spring 152 that has the opposite end thereof in engagement with the underside of a head portion 154 of the armature. On the upper face of the head 154 is supported a circular valving element 156 that is biased by the spring 152 into sealing engagement with a seat 158 formed on the underside of a valve insert 160 having a passageway 162 therethrough in communication with the crossover passageway 110 thence to the conduit 44.

On one side of the housing is an elongated depending tubular extension 164 which has a tubular fitting 166 therein held in place by a support plate 168 that fits in and around a groove 170 in the tubular fitting 166 to hold it within an outlet passageway 172 through the extension 164.

The lower end of the tubular fitting 166 includes a plurality of circumferential ribs 174 thereon that interlock within one end of the inlet or section conduit 64 as seen in FIG. 2. A groove 176 in the insert 166 supports an O-ring seal 178 that sealingly engages the inside wall of the extension 164 to seal the passageway 172 as fluid flows therefrom into an opening 180 in the insert 166.

Backflow through the suction conduit 64 is blocked by means including a coil spring 182 that has one end thereof supportingly received on an end shoulder 184 on the insert 166 and the opposite end thereof supportingly received by a guide boss 186 on a valving element 188. It has an upper face 190 thereon normally spring biased closed against a valve seat 192 around housing passageway 194 as is best seen in FIG. 5.

In accordance with certain principles of the present invention the electronic control module 72 includes means for producing a predetermined time delay in the system to prevent operation of the system by normal road movements of the vehicle. Additionally, the module 72 includes means that constitute a controller for the motor 56 to energize it following periods when the vehicle is unloaded thereby to cause the auxiliary load supporting devices 12, 14 to be pumped down to level the vehicle.

A further feature is that the module 72 includes means for controlling the electrical solenoid to be operative following a sustained addition of load to the vehicle to pump up or pressurize the auxiliary load supporting devices 12, 14 to correct for spring compression that would locate the chassis of the vehicle below a predetermined height relationship with respect to an unsprung mass portion of the vehicle. When the solenoid operated valve 74 is energized it directs a predetermined amount of air from the interior of the pressurized tank 54 into the variable volume pressurizable chambers 20 of the devices 12, 14.

Figure 7:
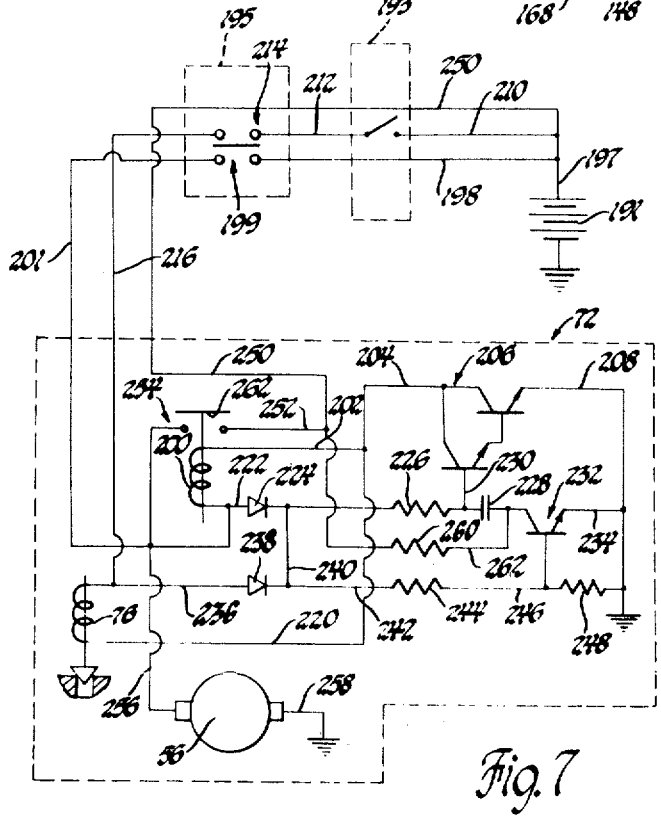
FIG. 7 is an electric circuit diagram of a control system for regulating the electrical components in the system of FIG. 1.
Figure 6:
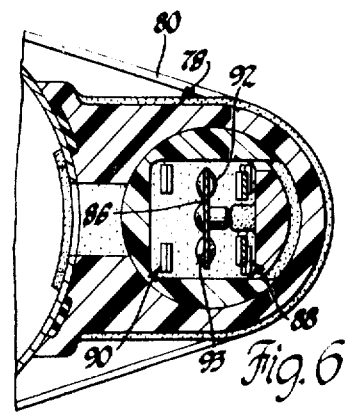
FIG. 6 is an enlarged horizontal sectional view taken along the line 6—6 of FIG. 1 looking in the direction of the arrows.

The module 72 is more particularly set forth in the control circuit of FIG. 7 which is illustrated as including a DC battery 191, for example, a 12 volt rated vehicle battery. Additionally, the circuit includes an ignition switch 193 and the double pole double throw switch 195 operated by the height sensor 78 on the side of the device 10.

The circuit includes a first power circuit for control of the motor including a conductor 197 connected to the positive terminal of the battery 193 and a conductor 198 electrically connected to one terminal of a normally open switch 199. The other terminal thereof is electrically connected by a conductor 201 to one side of a motor relay coil 200 that has the opposite side thereof electrically connected by a conductor 202 thence through a conductor 204 to the anode terminal of a solid state switching device 206 that is maintained normally off. When device 206 is electrically conductive the coil circuit is completed through a conductor 208 to ground.

Additionally, the circuit includes a solenoid power circuit from conductor 197 thence through a conductor 210 to the ignition switch 193 thence through a conductor 212 to one terminal of a second normally open switch 214 that has the other terminal thereof connected by a conductor 216 to one side of a solenoid valve coil 76.

The opposite side of the coil 76 is connected by a conductor 220 to the previously described portion of the electrical circuit through the solid state switching device 206 thence to ground.

The solid state switching device 206 is under the control of a timing circuit that is electrically connected to both of the aforementioned power circuits under the control of the height sensor 190.

The timing circuit more particularly includes, in the case of the motor power circuit, a conductor 222 from conductor 201 which is connected to a diode 224 which in turn is electrically connected to a resistor 226 thence to the negative terminal of a capacitor 228. Additionally, a conductor 230 electrically connects the base or control terminal of the solid state switching device 206 to the RC timing circuit represented by the resistance 226 and the capacitor 228.

The RC circuit is completed from the positive terminal of the capacitor 228 through a NPN reset transistor 232 that has its emitter electrically connected by a conductor 234 to conductor 208 to ground.

In the case of the solenoid coil circuit the timing circuit is constituted by a conductor 236 that is electrically connected to one side of a diode 238 which has its opposite side electrically connected by a crossover conductor 240 to the aforementioned RC timing circuit including the resistor 226, the capacitor 228 and the normally closed reset transistor 232.

Additionally, the control circuit includes a signal circuit to the transistor 232 which is energized if either of the aforementioned motor power or solenoid power circuits are completed by the height sensor switch 78. More particularly it includes a conductor 242 electrically connecting the crossover conductor 240 to one side of a resistor 244 which has the opposite side thereof electrically connected by a conductor 246 to the base of the transistor 232. A resistor 248 electrically connects the base-emitter junction of the transistor 232 to the conductor 208 to ground.

In addition, the circuit includes a continuously energized circuit from the positive terminal of the battery 191 to a conductor 250 which is electrically connected by conductor 252 to one contact of a relay operated motor control switch 254 which has the other contact thereof electrically connected by a conductor 256 to one side of the electric drive motor 56 which has the opposite side thereof electrically connected by conductor 258 to ground.

Additionally, the conductor 250 is electrically connected to one end of a resistor 260 which in turn is electrically connected by conductor 262 to a junction between the positive terminal of the capacitor 228 and the collector of the transistor 232.

Operation of the system produces a signal when the vehicle is riding above or below a predetermined normal riding level from the positive terminal of the battery 191 through height sensor 78 thence through either the power circuit of the motor relay coil or that of the solenoid coil to the RC timing circuit. Furthermore, the circuit includes means to operate either the solenoid valve or the compressor in response to a continued vehicle riding height signal representing a change in loading of the vehicle.

Under a no signal condition when the vehicle is level and the movable contact of the sensor 78 is positioned in open relationship with respect to both the switch 199 and the switch 214, the transistor 232 is turned off thereby acting as an open switch to ground. The capacitor 228 during this period is charged through conductor 250, the resistance 260 to the positive terminal of the capacitor. The level of charge on the positive terminal of the capacitor 228 will equal that of the voltage of the battery 186 which can, even with a 12 volt rated battery, vary in a range from 10 to 15 volts depending upon the condition of the battery at a particular time.

When either the switch 199 in the motor power circuit or the switch 214 in the solenoid power circuit is closed, the transistor 232 is immediately turned by a current applied to its base from either of the power circuits. This completes the above-defined capacitor charging circuit.

At this point in the system operation, the capacitor voltage at the base of the Darlington pair 206 is now a negative voltage with reference to ground an amount equal to the battery voltage.

Additionally, the capacitor 228 is connected to ground through the transistor 232. The capacitor charges in the opposite direction from this minus battery voltage to approximately 1 volt positive. When a certain predetermined positive voltage is reached, this is a base current flow which turns on the Darlington pair 206. The amplifier begins to conduct from its anode to its cathode terminal and provides a current path to ground for either the relay coil 200 or solenoid coil 218. The delay time is measured from the time the signal turns on the transistor 232 to the time that the Darlington amplifier 206 is conductive.

The charging time of the capacitor 228 is controlled by resistor 226 which is large with respect to the other resistors in the network. When the sensor switch 78 has its switches 199, 214 opened, the transistor 232 immediately shuts off. The resistor 260 is relatively small compared to the resistor 226 and the capacitor 228 thereby is recharged to the negative battery voltage in a very short length of time as compared to the time period following closure of the contacts 199, 214, to reach the Darlington turn on voltage.

This way, a long delay time may be achieved with a small capacitor 228 and a very fast reset time is also available.

This fast reset time is due to the switching action of the transistor 232 and the relatively low resistance value of the resistor 260. The long delay time is due to the large voltage swing which the capacitor must undergo before the Darlington turn on voltage is reached and the large value of resistor 226. The large swing of voltage is due to the fact that the capacitor 228 is initially charged, at the base of the Darlington amplifier 206, negative with respect to ground.

The primary function of the unidirectional current diodes 224, 238 in the circuit is to insure that only one component (either the solenoid valve or the electric motor driven air pump) is turned on when the Darlington pair is turned on.

When the switch 214 is closed by a large load increase on the vehicle a period of time elapses until the Darlington turn on voltage is reached. When this occurs the solenoid valve 74 opens and, as shown in FIG. 1, high-pressure fluid from within the tank 54 passes through the conduit 44 into both of the auxiliary load supporting devices 12, 14 thereby producing a resultant uplifting force on the chassis of the vehicle that supplements that of the primary coil spring to return the vehicle chassis to its desired level operating position.

When the vehicle is unloaded the motor controlled switch 196 is closed, and after it remains closed for the same specified length of time, the compressor 58 is actuated. However, the compressor motor current does not pass through the Darlington amplifier 206. The amplifier does carry current through the energization circuit for the coil 200 which causes an armature 262 of the relay 254 to be pulled in a direction to close the contacts 262 of the relay 254 to complete the energization circuit for the motor 56. This arrangement avoids the need for using a large solid state switching device capable of carrying the energization current of the pump motor which is in the order of 28 amperes.

In one working embodiment of the above-described circuit, the electrical and mechanical components have the following ratings:

| Item | Rating |
| --- | --- |
| Darlington Amplifier 206 | GE-D28C5—½ amp |
| Resistor 226 | 200 K ohms |
| Capacitor 228 | 50 mfd. |
| Transistor 232 | GE-2N5172 |
| Resistor 244 | 10 K ohms |
| Resistor 248 | 2 K ohms |
| Resistor 260 | 1 K ohm |

In the aforementioned circuit, the time delay function provided by the RC circuit defined by resistor 226 and capacitor 228 is 5 seconds.

Another feature of this arrangement is that the Darlington Amplifier 206 can be triggered in a range from 1 to 1.6 volts depending upon the temperature condition of operation, even with the charging source varying in the range from 10 to 15 volts.

Another advantage is that the ratio of the reset bias resistor 260 to the timing circuit resistor 226 is 100 to 200 which allows the capacitor to be recharged to an initial negative battery voltage at the base of the Darlington amplifier 206 in a much shorter period of time than a ten second timing period that it takes to charge the Darlington amplifier 206 to a turn on voltage through the timing circuit defined by resistor 226, capacitor 228 and the conductive transistor 232. In this way a long time delay can be achieved with a small low cost capacitor and a fast reset time is available because of the switching action of the low cost transistor 232.

Because of this ratio the charging time to turn on the Darlington amplifier 206 is in the order of ten seconds and the reset time is in the order of ¼ second which in effect is instantaneous insofar as the operational characteristics of the mechanical leveling system is concerned.

While the embodiments of the present invention, as herein disclosed, constitute a preferred form, it is to be understood that other forms might be adopted.

We claim:

1. An automatic vehicle leveling system comprising pressurizable auxiliary spring means for maintaining a predetermined height relationship between the sprung and the unsprung mass of a vehicle, a tank including an outlet therefrom, conduit means for communicating the outlet with said spring means, solenoid operated valve means including a first electrically energizable component for controlling flow of pressurized fluid from said tank through said outlet, a compressor within said tank including an inlet, check valve means communicating said compressor inlet with said conduit means, said check valve means blocking flow of fluid from said inlet to said conduit means, means including a second electrically energizable component for operating said compressor, said compressor including an outlet directly in communication with the interior of said tank for pressurizing said tank when said compressor is operated, an undamped height sensor switch responsive to the height relationship between the sprung and unsprung masses having a first operative position for connecting one of said electrically energizable components to a power source and a second operating position for connecting the other of said components to a power source, circuit means electrically connected to each of said energizable components for controlling energization thereof when said height sensor is in either its first or second position, said circuit means including time delay means for preventing operation of said components during a momentary movement of said height sensor into said first and second positions, said time delay means being responsive to a predetermined sustained closure of said undamped sensor to condition said circuit means to energize said first or second electrical components.

2. In an automatic vehicle leveling system of the type including an auxiliary fluid spring between the sprung and the unsprung mass which is selectively pressurized under the control of an undamped height sensor switch for selectively energizing an electric motor driven compressor the combination of; first and second electrically energizable components, one of said components being operated during a pump-up phase of operation and the other of said components being operated during an exhaust phase of operation, means for electrically connecting each of said components to a power source including a switching device, means for directing a signal from the undamped height sensor switch when the vehicle is above or below a predetermined height relationship, time delay means responsive to said signal following a predetermined period of time to condition said switching device to energize one of said electrical components to produce either said pump-up or exhaust phase of operation, and means operative to reset said time delay means when a signal from the height sensor is of a duration less than that required to condition said switching device for energization of either said first or second electrical components.

3. An automatic leveling system for a vehicle having a sprung and an unsprung mass comprising; a pair of spaced apart auxiliary pressurizable springs interposed between the sprung and the unsprung mass of a vehicle for maintaining a predetermined height therebetween, an undamped height sensor switch for sensing the position of the sprung mass with respect to the unsprung mass, a pressure tank, an electric motor located within said tank, a compressor driven by said electric motor including an inlet and an outlet, said outlet being in direct communication with the interior of said tank, an integral valve assembly having a check valve and a solenoid operated valve therein, means communicating said check valve with said compressor inlet, said valve assembly including a cover, a crossover passageway in said assembly communicating said solenoid operated valve with said check valve, a common conduit connected to said crossover passageway and to said springs for varying the pressure level therein, said undamped height sensor switch including first means for conditioning said solenoid operated valve to communicate the interior of said storage tank with said crossover passageway during a pump-up phase of operation, said height sensor switch including second means operative to energize said electric motor to operate said compressor to exhaust fluid from said springs through said common conduit and said check valve to said compressor for discharge into said tank during a pump-down phase of operation, and circuit means electrically interposed between said undamped height sensor switch and said electrically energizable solenoid operated valve and electric drive motor for delaying operation of said valve or motor in response to transient movements of the sprung mass above or below a predetermined height relationship with respect to the unsprung mass.

4. A combination valve assembly for use in an automatic leveling system of the type including a pressure tank for supplying fluid spring means, a housing having an annular flange adapted to be fit through an opening in the pressure storage tank for the leveling system in sealing relationship therewith, a header on said housing located exteriorly of said tank and a skirt located interiorly thereof, said header including means for charging said tank to a predetermined pressure level, said header further including a fitting adapted to be connected to a common conduit for exhaust and pump up of fluid spring means, a crossover passageway in said header connected to said fitting, a first passageway from said crossover, a second passageway from said crossover, solenoid valve means for blocking said first crossover to control communication between the interior of said tank and said fitting, a one way check valve mechanism for controlling flow of fluid through said second passageway during an exhaust phase of operation, said check valve including a valve seat around said second passageway, a valving element, and spring means for maintaining said check valve normally closed against said seat to prevent backflow of fluid through said second passageway into said conduit.

5. A combination valve and electronic control assembly for location within a pressurized storage tank comprising; a housing having an elongated skirt located within said tank, an annular flange on said housing including means for sealing the opening through said annular tank, an outlet fitting from said housing, a first passageway in communication with said outlet, second and third passageways intersecting said first passageway, said second passageway including a valve seat therein, solenoid operated valve means maintained normally closed against said seat for blocking communication between said tank interior and said first passageway, said solenoid valve means including an electrically energizable coil, an armature stem located centrally of said coil, a sleeve bearing within said coil for slidably supporting said armature stem for reciprocal movement with respect to said coil, said coil and said sleeve defining a flow passageway from said tank interior, spring means for maintaining said armature in a closed relationship with respect to said seat, said coil when energized causing said stem to move downwardly against said spring to open said passageway during a pump-up phase of operation, said valve assembly further including a suction inlet, a one way check valve for blocking fluid flow from said suction inlet into said second passageway to prevent high-pressure fluid leakage across a compressor through the inlet thereof from the pressurized tank.